(No Model.)
W. L. CHURCH & S. A. REEVE.
ICE MAKING APPARATUS.
No. 529,342. Patented Nov. 13, 1894.
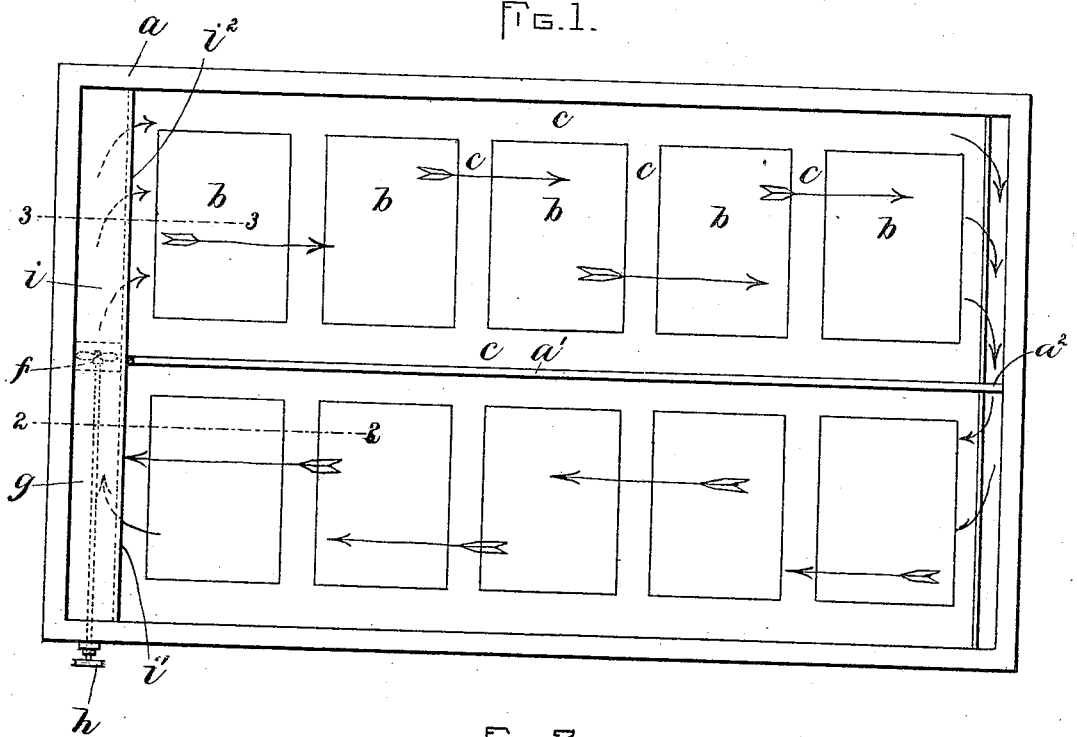
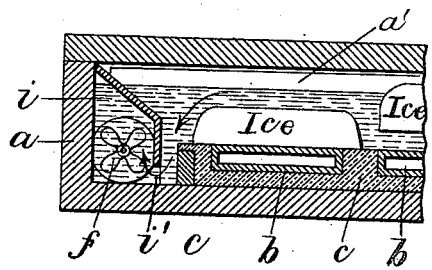
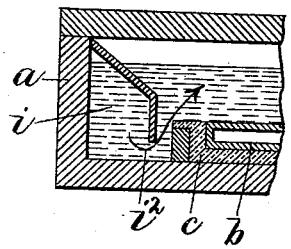
WITNESSES:
INVENTORS

UNITED STATES PATENT OFFICE.

WILLIAM LEE CHURCH, OF NEWTON, AND SIDNEY A. REEVE, OF BOSTON, MASSACHUSETTS, ASSIGNORS TO THE WESTINGHOUSE, CHURCH, KERR & COMPANY, OF JERSEY CITY, NEW JERSEY, AND NEW YORK, N. Y.

ICE-MAKING APPARATUS.

SPECIFICATION forming part of Letters Patent No. 529,342, dated November 13, 1894.

Application filed January 30, 1894. Serial No. 498,427. (No model.)

*To all whom it may concern:*

Be it known that we, WILLIAM LEE CHURCH, of Newton, in the county of Middlesex, and SIDNEY A. REEVE, of Boston, in the county of Suffolk, in the State of Massachusetts, have invented certain new and useful Improvements in Ice-Making Apparatus, of which the following is a specification.

This invention relates to artificial ice making in which a horizontal tank is employed, provided at its bottom, with ice forming or generating means, the arrangement being such that the water is frozen from the bottom of the bed upward.

This invention has for its object mainly to enable ice to be frozen in a tank in such manner as to form a series of cakes, either wholly or partially separated from each other, without the employment of partitions to separate the cakes, so that a number of cakes of commercial size may be formed in one tank, and readily separated from each other.

This invention also has for its object to provide an improved system of circulating water in a tank in which ice is being formed from the bottom upward, the circulation of the water continuously brushing from the surface of the ice any air bubbles that may be expelled from the ice, thus preventing said bubbles from being entrapped in the ice.

To these ends, the invention consists in the improvements which we will now proceed to describe and claim.

In the accompanying drawings, forming a part of this specification, Figure 1 represents a top plan view of an ice making tank embodying our invention. Fig. 2 represents a section on line 2—2 of Fig. 1. Fig. 3 represents a section on line 3—3 in Fig. 1.

The same letters of reference indicate the same parts in all the figures.

In the drawings, $a$ represents a horizontal tank which is of much more than the ordinary length, and may be constructed of wood or other suitable material. The length of the tank is sufficient to enable a series of cakes of ice of a commercial size to be formed simultaneously on the bottom of the tank, and the width of the tank may be suitable for the formation of one row of cakes or more than one row. We have here shown the tank as of suitable width for the formation of two rows of cakes, the tank having a central partition $a'$. $b\,b\,b$ represent a series of ice forming or generating beds, which are preferably hollow casings adapted to receive a volatile liquid and to permit the expansion of such liquid for the purpose of abstracting heat from the water in the tank. Said beds are surrounded by strips or sections $c\,c$ composed of a material of low conductivity to which ice will not adhere, a suitable material being paraffine. Said sections $c$ have their upper surfaces flush with the upper surfaces of the bed $b$, and the material of which they are composed not only surrounds the beds but also extends under the same and insulates them from the bottom of the tank.

It will be seen that when water is placed in the tank and a volatile liquid is expanded in the beds $b$, a freezing action will take place on said beds in an upward direction, the ice extending laterally from the beds to a slight extent over the limiting sections $c$, the horizontal extension of the ice being due only to the passage of heat through the ice itself, there being no passage of heat from the water to the freezing beds through the limiting section $c$. The result is that a series of cakes are formed side by side in the tank, said cakes being as here shown entirely independent of each other, without being separated from each other by partitions or barriers. Hence after the freezing operation the cakes can be moved horizontally toward one end of the tank without being raised from the bottom thereof.

The bottom of the tank presents an unobstructed surface over which the cakes may slide. The cakes may therefore be accumulated at one end of the tank, to be subsequently removed, or the tank may have a removable end section the removal of which forms an opening through which the cakes may be slid without being raised from the bottom of the tank.

In practice, we prefer to arrest the freezing process before the top surfaces of the cakes reach the top surface of the water, so that after the cakes have been formed they may be raised or floated from the bottom of the bed by the action of the remaining water. When this is done, the cakes after their liberation may be floated or carried to one end of the tank by imparting a movement to the water. To this end and for a further purpose hereinafter stated we provide means for circulating the water horizontally in the tank so that the cakes may be driven or carried to one end thereof.

We have here shown as the water circulating means a screw propeller $f$ mounted on a shaft $g$ which is journaled in the bearings in the tank and may be rotated by means of a driving belt on a pulley $h$ affixed to said shaft. The propeller $f$ is located in a flume or passage $i$ formed at one end of the tank and extending across the same, said passage having an opening $i'$ at one side of the partition $a'$ to receive water from the tank, and an opening $i^2$ at the opposite side of the partition $a'$ to deliver water to the tank. The propeller $f$ is located between said openings $i'$ and $i^2$, and is arranged to impart a movement to the water such as is indicated by the arrows in Fig. 1. At the opposite end of the tank the partition $a'$ has an opening $a^2$ through which water moves from one end of one of the compartments of the tank to the corresponding end of the other compartment. By this arrangement the water is circulated through all parts of the tank and is not only caused to float or impel the cakes and accumulate the same after they have been liberated, but also to brush the top surfaces of the cakes during the freezing process for the purpose of removing the bubbles of air as fast as they are formed, and before they can be frozen into the ice.

It will be observed that the openings $i'$ $i^2$ are close to the bottom of the tank, and are so arranged relatively to the beds $b$ as to compel an effective movement of the water over the beds and over the ice thereon during the entire freezing process, without regard to the height of the upper surfaces of the cakes. If said openings were located near the top of the body of water in the tank, the current caused by the action of the propeller would not be as effective during the first part of the freezing process, when the top surfaces of the cakes are near the bottom of the tank as it would be later.

If desired, the ice-limiting sections may be made of such width that the cakes of ice will extend over the said sections until portions of the ends of the cakes meet and adhere between the beds. When this occurs, a continuous cake will be formed, having transverse depressions or grooves in its top surface over the transverse sections $c$. Said grooves enable the cake to be readily subdivided into smaller cakes of uniform size.

We claim—

1. An ice making tank having a water space the bottom of which is composed of a series of ice forming or generating beds and bed-separating ice-limiting strips or sections substantially flush with the beds, said sections limiting the horizontal extension of ice from the beds, so that a series of independent cakes or a continuous cake having grooves in its top surface may be formed on the bottom of the tank.

2. An ice making tank having a water space, the bottom of which is composed of a series of ice forming or generating beds and bed-surrounding ice-limiting sections substantially flush with said beds, combined with means for moving or circulating water in said tank, substantially as and for the purposes specified.

3. An ice making tank having a water space centrally divided into two compartments communicating with each other at the ends of the tank, the bottom of each compartment being composed of a series of ice forming or generating beds and bed-surrounding ice-limiting sections, combined with a propeller located in a transverse passage at one end of the tank and adapted to circulate the water in the tank, as set forth.

4. An ice-making tank having at one end a passage or casing containing a water circulating device, said casing communicating with the tank through openings close to the bottom of the tank.

In testimony whereof we have signed our names to this specification, in the presence of two subscribing witnesses, this 20th day of January, A. D. 1894.

WM. LEE CHURCH.
SIDNEY A. REEVE.

Witnesses:
C. F. BROWN,
ARTHUR W. CROSSLEY.